(12) United States Patent
Strobel et al.

(10) Patent No.: US 7,442,442 B2
(45) Date of Patent: Oct. 28, 2008

(54) METHODS, SYSTEMS, AND POLYMER SUBSTANCES RELATING TO CONSIDERATION OF H₂O LEVELS PRESENT WITHIN AN ATMOSPHERIC-PRESSURE NITROGEN DIELECTRIC-BARRIER DISCHARGE

(75) Inventors: Mark A. Strobel, Maplewood, MN (US); Seth M. Kirk, Minneapolis, MN (US); Joel A. Getschel, Osceola, WI (US); Matthew J. Skaruppa, Chicago, IL (US)

(73) Assignee: 3M Innovative Properties Company, St. Paul, MN (US)

( * ) Notice: Subject to any disclaimer, the term of this patent is extended or adjusted under 35 U.S.C. 154(b) by 271 days.

(21) Appl. No.: 10/883,263

(22) Filed: Jul. 1, 2004

(65) Prior Publication Data
US 2006/0003178 A1 Jan. 5, 2006

(51) Int. Cl.
*B05D 3/00* (2006.01)
(52) U.S. Cl. ..................................... 428/444
(58) Field of Classification Search ....................... None
See application file for complete search history.

(56) References Cited

U.S. PATENT DOCUMENTS

| 3,639,134 | A | 2/1972 | Stegmeier et al. |
| 4,055,685 | A | 10/1977 | Bayer et al. |
| 4,563,316 | A | 1/1986 | Isaka et al. |
| 4,717,516 | A | 1/1988 | Isaka et al. |
| H688 | H | 10/1989 | Sobataka et al. |
| 5,244,780 | A | 9/1993 | Strobel et al. |
| 5,769,703 | A | 6/1998 | Conlin |
| 6,631,726 | B1 * | 10/2003 | Kinoshita et al. ........ 134/102.1 |
| 2003/0075432 | A1 | 4/2003 | Cocolios et al. |

FOREIGN PATENT DOCUMENTS

| EP | 0 005 510 A1 | 11/1979 |
| EP | 0 372 756 A2 | 6/1990 |
| FR | 2737981 | 2/1997 |
| GB | 1 253 630 | 11/1971 |
| GB | 1253630 | 11/1971 |
| JP | 63-152650 | 6/1988 |
| JP | 21990-137118 | 5/1990 |
| JP | 403042066 A | 2/1991 |
| JP | 2001-233971 | 8/2001 |
| NL | 6908037 | 12/1969 |
| WO | WO 99/18149 | * 4/1999 |

OTHER PUBLICATIONS

Article: Guimond et al., "Biaxially Oriented Polypropylene (BOPP) Surface Modification by Nitrogen Atmospheric Pressure Glow Discharge (APGD) and by Air Corona," *Plasmas and Polymers*, vol. 7, No. 1, Mar. 2002, pp. 71-88.
Article: Miralaï et al., "Electrical and Optical Diagnostics of Dielectric Barrier Discharges (DBD) in He and N2 for Polymer Treatment," *Plasmas and Polymers*, vol. 5, No. 2, (2000), pp. 63-77.
Article: Massines et al., "The Role of Dieletric Barrier Discharge Atmosphere and Physics on Polypropylene Surface Treatment[1]," *Plasmas and Polymers*, vol. 6, Nos. ½, Jun. 2001, pp. 35-49.
*Polymer Surface Modification and Characterization*, Chi-Ming Chan, Hanser/Gardner Publications, Inc., Cincinnati, 1994.
J. Park, C. S. Lyons, M. Strobel, M. Ulsh, M. I. Kinsinger, and M. J. Prokosch; "Characterization of Non-Uniform Wettability on Flame-Treated Polypropylene-Film Surfaces", *Journal of Adhesion Science and Technology*, vol. 17, No. 5, pp. 643-653, 2003.
PCT/US2005/023670 International Search Report and Written Opinion of the International Searching Authority Oct. 24, 2005.
Plasma Treating System, ML0061-001, Owners Reference Manual, Enercon Industries Corporation, Jul. 5, 2002.

* cited by examiner

*Primary Examiner*—Sheeba Ahmed

(57) ABSTRACT

Methods and systems utilize an atmospheric-pressure nitrogen dielectric-barrier discharge to treat the surface of polymer substances. The atmospheric-pressure nitrogen dielectric-discharge may be maintained with a level of H₂O below a pre-defined amount, such as by measuring and controlling the H₂O within a treater, to produce a surface treatment for a polymer substance that yields desirable characteristics. Furthermore, the H₂O level may be measured and controlled according to a pre-defined amount or according to another parameter such as an analysis of the resulting polymer surface. For example, the polymer surface may be provided with an optimal added nitrogen-to-added oxygen ratio and/or an optimal stability based on washed and unwashed advancing contact angles such as by controlling the H₂O level within the treater based on these analyses of the treated polymer.

11 Claims, 1 Drawing Sheet

METHODS, SYSTEMS, AND POLYMER SUBSTANCES RELATING TO CONSIDERATION OF H₂O LEVELS PRESENT WITHIN AN ATMOSPHERIC-PRESSURE NITROGEN DIELECTRIC-BARRIER DISCHARGE

TECHNICAL FIELD

The present invention is related to an atmospheric-pressure nitrogen dielectric-barrier discharge used to treat the surface of polymer substances. More particularly, the present invention is related to the consideration of effects of an $H_2O$ level within the atmospheric-pressure nitrogen-baffler discharge of a treater.

BACKGROUND

The application of an atmospheric-pressure nitrogen dielectric-barrier discharge to polymer substances is a well-known, cost-effective manner of modifying surface properties of polymer substances. Polymer substance as used herein includes any polymer material, such as films, foams, non-wovens, three-dimensional objects, etc. Atmospheric-pressure nitrogen dielectric-barrier discharge as used herein refers generally to any process in which active nitrogen species (such as free radicals, ions, or electrically or vibrationally excited states) are produced by electron impact with nitrogen-containing molecules.

Atmospheric-pressure nitrogen dielectric-barrier discharge as used herein is also known by many other terms. These terms include but are not limited to nitrogen corona, nitrogen corona discharge, nitrogen barrier discharge, atmospheric-pressure nitrogen plasma, atmospheric-pressure nitrogen glow discharge, atmospheric-pressure nonequilibrium nitrogen plasma, silent nitrogen discharge, atmospheric-pressure partially ionized nitrogen gas, nitrogen filamentary discharge, direct or remote atmospheric-pressure nitrogen discharge, externally sustained or self-sustained atmospheric-pressure nitrogen discharge, and the like.

Modifications achieved by the atmospheric dielectric-barrier discharge include the affixation of nitrogen to the surface of the polymer substance. Wetting properties of the surface are greatly improved, thereby making the polymer substance useful for more applications than if the surface were left untreated.

However, there are shortcomings to the conventional application of an atmospheric-pressure nitrogen dielectric-barrier discharge. For example, the ratio of added nitrogen-to-added oxygen for the surface of the polymer may be lower than desired. Added nitrogen and added oxygen as used in this ratio refer to the atomic nitrogen and atomic oxygen, respectively, that are affixed to the polymer surface specifically by the discharge process. As another shortcoming, the contact angles of water or another liquid on the treated polymer surface may be higher than desired. Additionally, the surface of the polymer may be sensitive to exposure to water or other liquids, whereby water or other liquids reduce the wetting properties of the polymer.

SUMMARY

Embodiments of the present invention address these issues and others by considering the $H_2O$ levels that are present within the treater. It has been discovered that minimizing the $H_2O$ levels within the treater improves the characteristics of the treated surface, such as by increasing the amount of nitrogen that is affixed by the discharge, lessening the sensitivity of the surface properties to exposure to water, and improving the wetting properties. The $H_2O$ levels may be measured and controlled so as to produce polymer surface characteristics as desired. Furthermore, the $H_2O$ levels may be maintained at or below a predefined amount and/or may be adjusted in response to analysis of the polymer substance exiting the treater.

One embodiment is a method of treating a surface of a polymer substance with an atmospheric-pressure nitrogen dielectric-barrier discharge. The method involves generating the atmospheric-pressure nitrogen dielectric-barrier discharge. The method further involves measuring and controlling the levels of $H_2O$ present in the atmospheric-pressure nitrogen dielectric-barrier discharge. The atmospheric-pressure nitrogen dielectric-barrier discharge is applied to the surface of the polymer substance.

Another embodiment is a polymer substance comprising a treated surface that results from the following steps. An atmospheric-pressure nitrogen dielectric-barrier discharge is generated. The levels of $H_2O$ present in the atmospheric-pressure nitrogen dielectric-barrier discharge are measured and controlled, and the atmospheric-pressure nitrogen dielectric-barrier discharge is applied to the surface of the polymer substance.

Another embodiment is a method of treating a surface of polymer substances with an atmospheric-pressure nitrogen dielectric-barrier discharge. The method involves generating the atmospheric-pressure nitrogen dielectric-barrier discharge and applying the atmospheric-pressure nitrogen dielectric-barrier discharge to the surface of a polymer substance to form a treated surface. The method further involves determining a difference between an unwashed advancing contact angle and a washed advancing contact angle for the treated surface. When the difference is larger than a pre-defined difference, then the level of $H_2O$ present in the atmospheric-pressure nitrogen dielectric-barrier discharge is decreased for a subsequent application of the atmospheric-pressure nitrogen dielectric-barrier discharge to the surface of a subsequent polymer substance.

Another embodiment is a method of treating a surface of polymer substances with an atmospheric-pressure nitrogen dielectric-barrier discharge. The method involves generating the atmospheric-pressure nitrogen dielectric-barrier discharge and applying the atmospheric-pressure nitrogen dielectric-barrier discharge to the surface of a polymer substance to form a treated surface. The method further involves determining a ratio of added nitrogen-to-added oxygen for the treated surface. When the ratio is less than a pre-defined ratio, then the level of $H_2O$ present in the atmospheric-pressure nitrogen dielectric-barrier discharge is decreased for a subsequent application of the atmospheric-pressure nitrogen dielectric-barrier discharge to the surface of a subsequent polymer substance.

Another embodiment is a system for applying an atmospheric-pressure nitrogen dielectric-barrier discharge to polymer substances. The system includes a nitrogen gas input and a treater housing having an interior with a connection to the nitrogen gas input. The interior contains the atmospheric-pressure nitrogen dielectric-barrier discharge and contains the polymer substance in contact with the atmospheric-pressure nitrogen dielectric-barrier discharge. The treater housing receives a continuous flow of nitrogen gas through the nitrogen gas input. The system further includes a $H_2O$ sensor positioned to measure the $H_2O$ levels within the interior of the treater housing.

DETAILED DESCRIPTION

Figure 1:
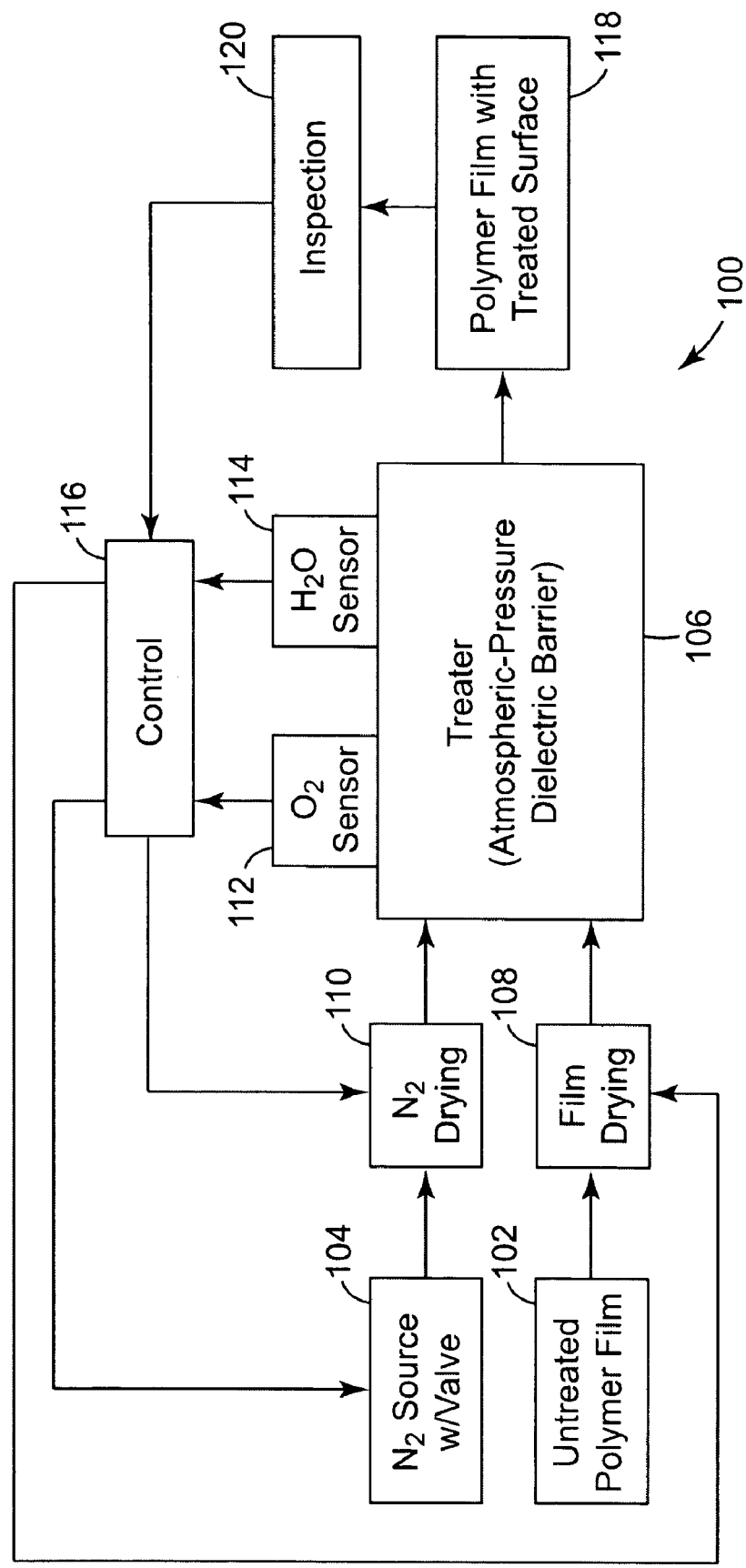
FIG. 1 is a diagrammatic representation of one example of a polymer surface treatment process and system that utilizes an atmospheric-pressure nitrogen dielectric-barrier discharge where consideration is given to the $H_2O$ levels that are present.

Embodiments of the present invention utilize the consideration of $H_2O$ levels to improve the surface properties of polymer substances treated by an atmospheric-pressure nitrogen dielectric-barrier discharge. The term $H_2O$ level as used herein refers to the volumetric concentration of $H_2O$. These embodiments consider the $H_2O$ levels in various manners such as by measuring and controlling the $H_2O$ levels and by maintaining the $H_2O$ levels below pre-defined amounts. Consideration of $H_2O$ levels allows for the production of polymer substances with surface characteristics within specific ranges not otherwise possible.

FIG. 1 diagrammatically represents an example of a polymer substance treatment process and system 100 that may be employed to give consideration to $H_2O$ levels present within an atmospheric-pressure nitrogen dielectric-barrier discharge. The process of FIG. 1 involves creating an atmospheric-pressure nitrogen dielectric-barrier discharge within a treater housing 106 and applying this discharge to a polymer substance 102 to modify the surface properties. The process further involves monitoring the presence of additional substances within the treater housing 106, namely oxygen and $H_2O$, and responding by altering the levels of these substances as necessary.

Treater housing designs may vary. However, it will be appreciated that the treater housing 106 should be capable of receiving inputs to the process and providing treated polymer substances as an output while minimizing atmospheric leakage. Minimizing this leakage allows for control of substances such as oxygen and $H_2O$ within the treater 106.

Nitrogen gas is provided from a nitrogen gas source 104, and the process receives nitrogen gas as one input. The nitrogen source 104 typically provides cryogenically derived nitrogen gas for the process. This nitrogen source 104 may be provided with a valve that allows for the control of nitrogen gas flow rate through an input into the interior of the treater housing 106. The nitrogen gas is used to purge the interior of the treater 106 to allow for the control of substances including oxygen and $H_2O$. An increase in the volume of nitrogen purge gas within the treater 106 results in a decrease in the level of the other substances. Thus, when it is necessary to decrease the level of $H_2O$, one option is to further open the valve of the nitrogen source 104 to increase the flow rate to the treater 106 and/or to delay commencement of the treatment process until an additional amount of nitrogen purge gas has entered the treater 106.

The nitrogen gas may be channeled through a nitrogen drying system 110 prior to entering the treater 106. A nitrogen drying system 110 reduces the $H_2O$ content present in the nitrogen gas. Examples of a nitrogen drying system 110 include activated carbon traps, molecular sieves, and standard commercial dehydration equipment. The nitrogen drying system 110 may be applied to the nitrogen gas 110 as desired as an alternative or additional manner of controlling the levels of $H_2O$ present within the treater 106.

The process also receives polymer substance 102, typically untreated, as another input. The polymer substance 102 of this process may be of any variety, including but not limited to polyolefins such as polypropylene and polyethylene and copolymers of ethylene and proplylene, polyimides, polyamides, polyethylene terephthalate, etc. The polymer substance 102 is loaded within the interior of the treater 106 so as to be exposed to the atmospheric-pressure nitrogen dielectric-barrier discharge. The discharge interacts with the surface of the polymer substance 102 to affix nitrogen to the surface and improve the wetting properties. Specifically, the contact angles of liquids on the treated surface are greatly reduced.

Because the polymer substance 102 is loaded into or translates through the treater 106 from an external location, the polymer substance 102 itself is a source of $H_2O$ that is introduced into the interior of the treater 106. Accordingly, the polymer substance 102 may be passed through a substance drying system 108 prior to entering the treater 106. Examples of a polymer substance drying system 108 include infra-red heat lamps, an ancillary chamber having a dry air or dry nitrogen environment, or a hot-air oven. This substance drying system 108 may be applied to the polymer substance 102 as desired as an alternative or additional manner of controlling the level of $H_2O$ present within the treater 106.

The treater 106 is monitored in this example by both an oxygen sensor 112 and a $H_2O$ sensor 114. In most polymer treatment processes, it has been discovered that it is desirable to monitor both substances and also control the levels of each within the treater 106. An example of an oxygen sensor 112 is the Model 4100 Gas Purity Analyzer by Servomex of Norwood, Mass. An example of an $H_2O$ sensor 114 is the Cermet II Hygrometer by Kahn Instruments of Wethersfield, Conn. These analyzers provide an output in parts per million ("ppm") by volume.

The output of the oxygen sensor 112 and $H_2O$ sensor 114 may be relayed to a controller 116. The controller 116 may be instantiated in various forms, including an automated electronic controller such as a programmable logic device or alternatively as a human operator. The controller 116 analyzes the oxygen and $H_2O$ levels to determine whether a reduction is necessary. For example, a given treatment process may require that the level of $H_2O$ fall within a certain range or be maintained below a particular level. When the level of $H_2O$ is approaching the upper bounds of the range or is about to exceed the particular level, the control 116 may then perform a $H_2O$ level reduction.

Examples of performing a $H_2O$ level reduction include but are not limited to increasing the nitrogen gas flow rate by further opening the valve of source 104, increasing the amount of nitrogen gas drying by installing or further activating a nitrogen drying system 110, and/or increasing the amount of polymer substance drying performed by installing or further activating a substance drying system 108. Although likely more involved, reducing the atmospheric leakage into the treater 106 is another example of a $H_2O$ level reduction.

The treated polymer substance 118 that is output from the treater 106 may be analyzed by an inspection system 120 to allow for consideration of the effects of the $H_2O$ level. The inspection system 120 may include various tests such as X-ray photoelectron spectroscopy (i.e., XPS or ECSA) to determine the presence of nitrogen versus other elements such as oxygen and carbon. The inspection system 120 may include additional tests as well, such as contact angle measurements of water or another liquid for advancing and/or receding contact angles taken both before and after washing of the treated substance 118 with water or another liquid.

The results of the tests from the inspection system 120 may then be fed back to the controller 116 where action can be taken to control the level of $H_2O$ and/or oxygen based on whether the treated polymer substance 118 has surface properties that are desirable. For example, if the added nitrogen-to-added oxygen ratio as determined by spectroscopy is lower than is desired, which indicates that wetting properties and adhesion are not likely to be satisfactory, then the level of $H_2O$ may be reduced through one or more of the various manners described above. As another example, if the advancing or receding contact angles are too large, which directly indicates that the wetting properties and adhesion are unsatisfactory, then the level of $H_2O$ may be reduced. Additionally, if a difference between an unwashed advancing contact angle (i.e., the advancing contact angle measured before the substance is washed) and a washed advancing contact (i.e., the advancing contact angle measured after the substance is washed) is too great, which indicates that the surface is overly sensitive to exposure to a liquid such as water, then the level of $H_2O$ may be reduced.

The effects of various levels of $H_2O$ on the treatment of a polymer substance have been investigated, and these effects have been documented as provided in Table 1, discussed below. A polypropylene film was chosen as the subject polymer substance to be treated. Specifically, a 30 cm wide, 0.05 mm thick polypropylene film was produced by thermal extrusion and subsequent orientation using a homopolymer resin with a weight-average molecular weight of 360,000 and a peak melting point of 163 degrees Celsius. This film was then subjected to an atmospheric-pressure nitrogen dielectric-discharge.

During treatment by the atmospheric-pressure nitrogen dielectric-discharge, the polypropylene film was held in contact with a 25 cm diameter, 50 cm face-width steel ground roll coated with a 2 mm thick layer of CL500 ceramic dielectric manufactured by American Roller of Union Grove, Wis. In this "covered roll" electrode configuration, the powered electrode consisted of two 200 $cm^2$, 33 cm face-width stainless steel shoes separated from the ground roll by an electrode gap of 1.5 mm. The normalized discharge energy was fixed at 1.7 $J/cm^2$, which corresponds to a discharge power of 940 W and a film speed of 10 m/min.

The treater housing was continually flushed with ca. 1500 liters/min of cryogenically derived nitrogen gas, which maintained the concentration of molecular oxygen in the treater at less than 10 ppm. The trace quantities of oxygen present in the treater were primarily a result of atmospheric leakage into the treater housing. The concentration of $H_2O$ in the treater was varied by placing controlled amounts of liquid water into the treater housing. The $H_2O$ was varied from 20 ppm to over 4000 ppm to allow for a determination of the effects over a very broad range.

The samples of the treated polypropylene film were analyzed by X-ray photoelectron spectroscopy (XPS or ECSA). ECSA spectra were obtained on a Kratos Axis Ultra spectrometer using a monochromatic Al Kα photon source at an electron take-off angle with respect to the surface of 90 degrees. Spectra were referenced with respect to the 284.6 eV carbon 1s level observed for hydrocarbon. No oxygen was detected on the untreated polypropylene, and no elements other than nitrogen, carbon, and oxygen were detected on any treated polypropylene. Atomic ratios including added oxygen-to-added carbon, added nitrogen-to-added carbon, and added nitrogen-to-added oxygen were determined from the high-resolution ECSA spectra.

The samples of treated polypropylene were also analyzed for water contact angle measurements. Measurements of the advancing and receding contact angles in air of deionized, filtered water were made using the Wilhelmy plate method on a Thermo Cahn DCA-322 dynamic contact-angle instrument. Details of the Wilhelmy plate method for determining contact angles are well-known and can be found in various publications such as *Polymer Surface Modification and Characterization*, (1994) by C-M Chan or *Journal of Adhesion Science and Technology*, vol. 17, number 5, pp. 643-653 (2003). The treated films were washed with deionized, filtered water in a controlled fashion using the Thermo Cahn instrument. It will be appreciated that liquids other that water may be utilized for the contact angle measurement and for washing of the polymer substance. However, the data presented in Table 1 below is based on using water for both the contact angle measurements and for washing the polymer substance.

During the measurement of the water contact angles by the Wilhelmy plate method, washing of the surface was accomplished by the cycle of forcing the polypropylene film into a water bath, holding the film there for two minutes, and then retracting the film. Approximately one minute after washing, a second measurement of the advancing and receding water contact angles was performed, which generated the washed measurement. Because the receding water contact angles are always measured on washed surfaces due to the immersion during the advancing water contact angle measurement, there is no difference between the washed and unwashed receding water contact angles.

The difference between the initial or unwashed advancing contact angle measurement (first Wilhelmy cycle) and the washed advancing contact angle measurement (second Wilhelmy cycle) quantifies the sensitivity of the treated surface of the substance to water exposure. Samples showing little or no difference between the unwashed and washed advancing contact angles are considered to be insensitive to water exposure.

The following Table 1 illustrates the effects of varying the $H_2O$ levels within the treater.

TABLE 1

| [$H_2O$] in the $N_2$ Corona (ppm) | O/C Atomic Ratio | N/C Atomic Ratio | N/O Atomic Ratio | Advancing Contact Angle (unwashed) | Advancing Contact Angle (washed) | Receding Contact Angle |
|---|---|---|---|---|---|---|
| 25 | 0.06 | 0.10 | 1.7 | 76° | 76° | 0° |
| 40 | 0.05 | 0.07 | 1.4 | — | — | — |
| 50 | 0.06 | 0.09 | 1.5 | 68° | 70° | 0° |
| 55 | 0.04 | 0.08 | 2.0 | 76° | 76° | 0° |
| 100 | 0.06 | 0.09 | 1.5 | 69° | 69° | 0° |
| 200 | 0.06 | 0.09 | 1.5 | 72° | 76° | 6° |
| 300 | 0.06 | 0.08 | 1.3 | 74° | 87° | 12° |
| 700 | 0.06 | 0.06 | 1.0 | 77° | 91° | 11° |
| 800 | 0.08 | 0.06 | 0.8 | 84° | 87° | 14° |
| 1200 | 0.03 | 0.01 | 0.3 | 84° | 97° | 17° |
| 1300 | — | — | — | 82° | 95° | 16° |
| >4000 | 0.03 | 0.01 | 0.3 | 82° | 96° | 13° |

For these measurements, the standard deviations for the ratios are 0.01-0.02. The standard deviations for the water contact angle measurements are 2-3 degrees. The standard deveation for the water level is 10%. Any reference to a ratio of about a particular value or any reference to a difference in water contact angles of about another particular value are intended to encompass at least the stated value plus or minus the corresponding standard deviation.

This data shows that as $H_2O$ levels increase above ca. 200 ppm, the nitrogen-to-carbon and nitrogen-to-oxygen ratios decrease. Furthermore, as the $H_2O$ levels increase above this amount, the difference between the unwashed and washed advancing water contact angle measurements increases while the receding water contact angle increases. Therefore, increasing levels of $H_2O$ in the discharge causes less effective nitrogen affixation to the polymer surface, more sensitivity to water exposure, and generally poorer wettability.

Specifically, for $H_2O$ levels less than or equal to 200 ppm, the resulting film had superior characteristics including an added nitrogen-to-added oxygen ratio of at least 1.5 while also having a difference between unwashed and washed water contact angle measurements of less than five degrees. Furthermore, when the level of $H_2O$ was reduced to 100 ppm, the receding water contact angle dropped to zero. When the level of $H_2O$ was maintained at 55 ppm, the resulting film had superior characteristics including an added nitrogen-to-added oxygen ratio of 2 while having no difference in unwashed and washed water contact angles.

Based on these results, logic may be applied by controller 116 of FIG. 1 to achieve the desired result for the treated polymer surface. In particular, the controller 116 may achieve results desirable for many purposes by maintaining the $H_2O$ levels within the treater 106 at a pre-defined level, such as 200 ppm or less. Results that may be better for certain purposes may be obtained by maintaining the $H_2O$ levels within the treater at 50 ppm or less. Furthermore, the controller 116 may control and vary the $H_2O$ levels over a particular range to achieve other results, such as a variation in the characteristics of the polymer substance over its length. Additionally, the controller 116 may adjust $H_2O$ levels based on a determination of whether the resulting substances are actually achieving the desired results, such as whether the added nitrogen-to-added oxygen ratio is large enough, such as at least 1.5, or whether the difference between washed and unwashed contact angles are small enough, such as no more than 5 degrees for water contact angles.

While the invention has been particularly shown and described with reference to various embodiments thereof, it will be understood by those skilled in the art that various other changes in the form and details may be made therein without departing from the spirit and scope of the invention.

What is claimed is:

1. A method of treating a polypropylene surface with an atmospheric-pressure nitrogen dielectric-barrier discharge, comprising:
    generating the atmospheric-pressure nitrogen dielectric-barrier discharge;
    measuring and controlling a level of $H_2O$ present in the vicinity of the atmospheric-pressure nitrogen dielectric-barrier discharge to determine whether the $H_2O$ level exceeds 200 PPM, and when the $H_2O$ level exceeds 200 PPM then reducing the $H_2O$ level to restore the $H_2O$ level to 200 PPM or below; and
    applying the atmospheric-pressure nitrogen dielectric-barrier discharge to the polypropylene surface.

2. The method of claim 1, wherein applying the atmospheric-pressure nitrogen dielectric-barrier discharge causes the surface to have an added nitrogen-to-added oxygen ratio greater than or equal to about 1.5.

3. The method of claim 1, wherein measuring and controlling the level of $H_2O$ includes measuring the $H_2O$ level within a treater housing and analyzing a characteristic of the polypropylene surface after being exposed to the nitrogen dielectric-barrier discharge and comparing each of the $H_2O$ level and the characteristic to a pre-determined level.

4. The method of claim 1, wherein reducing the $H_2O$ level comprises increasing the flow of a nitrogen purge gas to the atmospheric-pressure nitrogen dielectric-barrier discharge.

5. The method of claim 1, wherein reducing the $H_2O$ level comprises increasing an amount of drying applied to a nitrogen purge gas being provided to the atmospheric-pressure nitrogen dielectric-barrier discharge.

6. The method of claim 1, wherein reducing the $H_2O$ level comprises increasing an amount of drying being applied to the polypropylene surface before treatment.

7. A method of treating a polypropylene surface with an atmospheric-pressure nitrogen dielectric-barrier discharge, comprising:
    generating the atmospheric-pressure nitrogen dielectric-barrier discharge;
    applying the atmospheric-pressure nitrogen dielectric-barrier discharge to the polypropylene surface to form a treated surface;
    determining a difference between an unwashed advancing contact angle and a washed advancing contact angle for the treated surface; and
    when the difference is larger than five degrees, then decreasing the level of $H_2O$ present in the atmospheric-pressure nitrogen dielectric-barrier discharge for a subsequent application of the atmospheric-pressure nitrogen dielectric-barrier discharge to the polypropylene surface.

8. The method of claim 7, further comprising determining whether a receding water contact angle for the treated surface is greater than about zero, and when the receding water contact angle is greater than about zero, then decreasing the level of $H_2O$ present in the atmospheric-pressure nitrogen dielectric-barrier discharge.

9. The method of claim 7, further comprising maintaining the $H_2O$ level equal to 200 PPM or below when applying the atmospheric-pressure nitrogen dielectric-barrier discharge to the polypropylene surface to form the treated surface.

10. A method of treating a polypropylene surface with an atmospheric-pressure nitrogen dielectric-barrier discharge, comprising:
    generating the atmospheric-pressure nitrogen dielectric-barrier discharge;
    applying the atmospheric-pressure nitrogen dielectric-barrier discharge to the polypropylene surface to form a treated surface;
    determining a ratio of added nitrogen-to-added oxygen for the treated surface; and
    when the ratio is less than about 1.5, then decreasing the level of $H_2O$ present in the vicinity of the atmospheric-pressure nitrogen dielectric-barrier discharge for a subsequent application of the atmospheric-pressure nitrogen dielectric-barrier discharge to a subsequent polypropylene surface.

11. The method of claim 10, further comprising maintaining the $H_2O$ level below 200 PPM when applying the atmospheric-pressure nitrogen dielectric-barrier discharge to the polypropylene surface to form the treated surface.

* * * * *

UNITED STATES PATENT AND TRADEMARK OFFICE
CERTIFICATE OF CORRECTION

PATENT NO. : 7,442,442 B2  Page 1 of 1
APPLICATION NO. : 10/883263
DATED : October 28, 2008
INVENTOR(S) : Mark A. Strobel It is certified that error appears in the above-identified patent and that said Letters Patent is hereby corrected as shown below:

On the Title Pg Item (56)
Line 1, above "JP 63-152650 6/1988" delete "GB 1253630 11/1971".
Line 8, delete the word "Dieletric" and insert in place thereof -- Dielectric --.

Column 1
Line 14, after "nitrogen" insert the word -- dielectric --.
Line 14, delete the word "baffler" and insert in place thereof -- barrier --.

Column 4
Line 2, delete the word "proplylene" and insert in place thereof -- propylene --.

Column 5
Line 52, delete "A1" and insert in place thereof -- Al --.

Column 6
Line 56, delete the word "deveation" and insert in place thereof -- deviation --.

Column 8
Line 8, in claim 6, delete "1,wherein" and insert in place thereof -- 1, wherein --.

Signed and Sealed this

Tenth Day of March, 2009

JOHN DOLL
*Acting Director of the United States Patent and Trademark Office*